Feb. 17, 1970  R. D. RUMSEY  3,495,475
SERIES TUNED VISCOUS DAMPERS
Filed Dec. 29, 1967
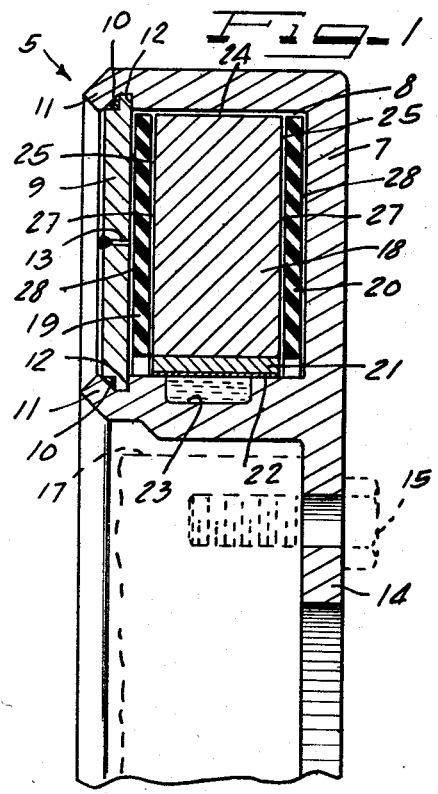
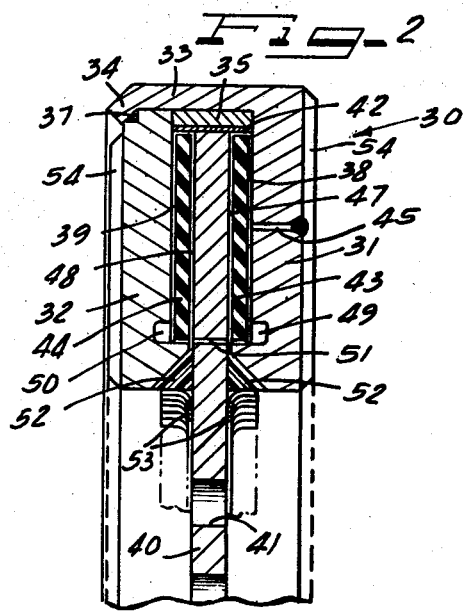
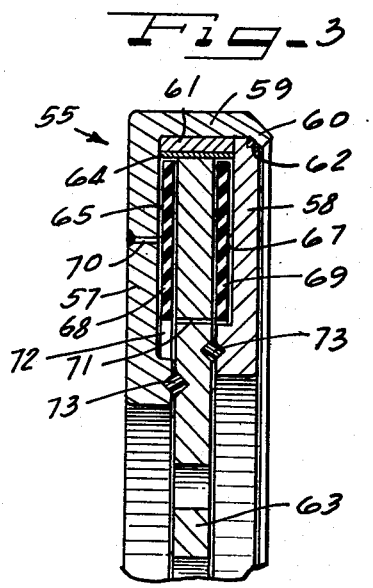
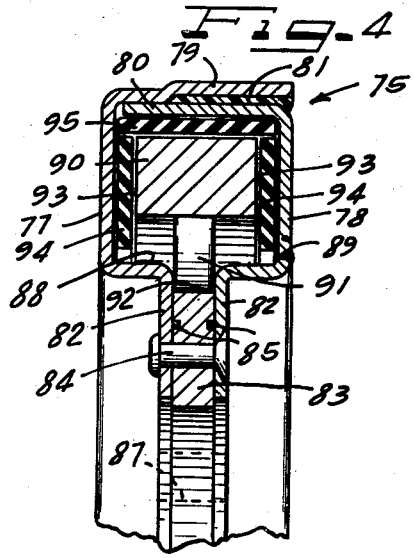
INVENTOR.
ROLLIN DOUGLAS RUMSEY
BY *Hill, Sherman, Meroni, Gross & Simpson* ATTORNEYS

United States Patent Office 3,495,475
Patented Feb. 17, 1970

3,495,475
SERIES TUNED VISCOUS DAMPERS
Rollin Douglas Rumsey, Buffalo, N.Y., assignor to Houdaille Industries, Inc., Buffalo, N.Y., a corporation of Michigan
Filed Dec. 29, 1967, Ser. No. 694,514
Int. Cl. F16f 15/10
U.S. Cl. 74—574                        6 Claims

ABSTRACT OF THE DISCLOSURE

A series tuned viscous damper has a member arranged to be secured fixedly to a structure subject to vibrations to be damped and an inertia mass freely movable relative to the member with an elastic tuning spring between spaced apart flat surfaces of the member and the inertia mass and all coupled in series including at least one viscous shear damping film. The member may define a hermetically sealed housing within which the inertia mass and the tuning spring are housed. In another form the member supports the inertial mass which defines a working chamber into which a portion of the member extends to provide the flat surface thereof spaced from the flat surface of the inertia member and between which surfaces the tuning spring is disposed.

---

This invention relates to new and improved series tuned viscous damper construction and is more particularly concerned with series tuned torsional viscous dampers of the type adapted to be attached to rotary shafts subject to vibrations to be damped.

It has heretofore been proposed to tune viscous dampers by the provision of bonded elastomeric springs wherein the tuning spring and the inertia mass operate in parallel with the damping coupling. Representative of the prior art is Patent No. 2,636,399. In such a damper the elastomeric spring is bonded to the metal of the inertia mass and the housing. However, the elastomer-metal bond is vulnerable to silicone fluid attack. Further, in the parallel relationship both the spring and the inertia mass must take the full angular windup to satisfy a desired operating condition at resonance.

An important object of the present invention is to overcome the foregoing and other deficiencies and shortcomings of prior art arrangements, and to provide for improved combination elastomeric tuning spring and viscous shear damping.

Another object of the invention is to provide a new tuned vibration damper construction utilizing viscous shear damping and elastomeric spring tuning in a manner to afford optimum viscous damping and elasticity for tuning.

A further object of the invention is to provide a novel tuned viscous sheared damper embodying the elastomeric springs which are in a free series relationship to the other damper members but in viscous shear coupled relation thereto.

Other objects, features and advantages of the present invention will be readily apparent from the following detailed description of certain preferred embodiments thereof taken in conjunction with the accompanying drawing, in which:

FIGURE 1 is a fragmentary radial sectional detail view through a torsional vibration damper embodying features of the invention.

FIGURE 2 is a similar view showing a modification.

FIGURE 3 is a similar view showing a further modification, and

FIGURE 4 is a similar view of yet another modification.

In FIGURE 1, a viscous shear damper 5 of the torsional vibration type is shown comprising relatively movable members, one of which provides an annular housing 7 which is desirably constructed with a minimum of seams or joints, and preferably as a casting, providing an annular working chamber 8 of generally rectangular transverse cross section opening from one side. An annular closure plate 9 over the open side of the chamber is hermetically sealed by respective annular static seals 10 under compression by rolled over retaining flanges 11 clamping the respective margins of the plate against shoulders 12 on the housing.

Viscous damping fluid such as a suitable grade and viscosity of silicone is filled into the working chamber 8 through one or more filler openings 13 in the closure plate 9 and hermetically sealed as by welding. Attaching means such as a radially inward integral flange 14 on the housing 7 is adapted to be secured fixedly in suitable manner as by means of bolts 15 to a structure such as a rotary shaft 17 subject to vibrations requiring damping.

Series tuned viscous damping is accomplished by providing within the working chamber 8 an inertia mass 18 and one or more, herein two, elastic springs 19 and 20, and more particularly elastomeric springs, coupled by means comprising at least one viscous shear damping film, between the inertia mass and the respective springs or between the springs and the housing, but desirably between both the inertia mass and the housing and the springs. To this end, the inertia mass 18 is in the form of a flywheel ring of rectangular transverse cross section concentrically rotatable within the chamber 8. For concentricity there is provided between one perimeter, herein the inner perimeter, of the inertia ring 18 and the housing a ring bearing 21 which may be made as a steel backing having a bronze bearing facing 22 confronting the annular bearing surface of the housing within the chamber 8, especially where the housing is constructed of a ferrous material. To assure bearing lubrication and to afford a fluid reservoir an annular groove 23 may be provided in the wall of the housing encompassed by the bearing 21. At its outer perimeter the inertia ring 18 provides an annular working surface in such spaced relation to the confronting complementary annular working surface of the housing within the working chamber 8 as to afford a viscous shear damping film coupling gap 24.

In order to attain maximum viscous shear damping film coupling between respective flat axially facing working surfaces 25 on the inertia ring 18 and the confronting complementary flat parallel axially inwardly facing working surfaces of the housing defining the working chamber 8, the tuning springs 19 and 20 are in the form of flat ring disks of substantially equal face area on both sides thereof to the working faces 25 and disposed between the working faces 25 and the working faces of the housing. Each of the tuning spring ring disks 19 and 20 is of a suitable thickness to accomplish the desired tuning function by virtue of elasticity of the elastomeric material thereof. Further, the spacing between the working surfaces 25 and the adjacent working surfaces of the housing is such with respect to each of the elastomeric tuning spring disks 19 and 20 as to provide a viscous shear damping film coupling gap 27 between each of the springs and the working faces 25 of the inertia ring and a respective viscous shear damping film coupling gap 28 between each of the springs and the confronting working surface of the housing. Through this arrangement, not only is viscous damping provided between the housing and the inertia mass ring 18, but tuning is provided in respect to at least one node by the elastic springs 19 and 20 as a function of the elasticity of the material thereof.

As is now well known, a viscous shear damping film coupling exists where a space between two relatively movable members is such with respect to the viscosity of the damping fluid that the relative movements of the members are resisted by the fluid in shear rather than affording a mere drag or lubricating film relationship. For a more detailed description of this viscous shear damping film relationship, attention is invited to Patent 2,514,136.

In addition to their elastic tuning capability, the spring disks 19 and 20 function as separators between the surfaces of the housing 7 within the working chamber 8, enabling the use of metal materials in the inertia mass and the housing which may be subject to galling and possibly binding in the presence of the silicone damping fluid if permitted to come in direct rubbing contact with one another, as is known in respect to ferrous materials. Thus, axial displacement of the inertia ring 18 toward the opposed axially facing housing wall surfaces is prevented by the interposition of the tuning spring disks 19 and 20. Yet, by virtue of the axial dimensional differentials between the housing walls, of the spring disks and the inertia ring 18 adequate operating circulation and distribution of the viscous damping fluid within the working chamber 8 and from the reservoir groove 23 are amply provided for to feed all of the various viscous shear damping films.

During normal co-rotational movement of the damper 5 with the shaft 17, the viscous coupling between the inertia ring 18 and the elastic springs 19 and 20 and the housing 7 tend to effect co-rotational movement of the inertia ring, the springs and the housing. In the presence of torsional vibrations of the shaft 17 and the housing 7 fixedly attached thereto, the inertia ring 18 tends to rotate uninterruptedly and to carry the elastomeric springs 19 and 20 with it by reason of the viscous couplings in the gaps 27. However, the springs 19 and 20 are viscously coupled to the housing through the gaps 28 so that the springs tend to vibrate torsionally with the housing 7. As a result, there is a series damping effect by energy absorption of the viscous fluid in the several shear film gaps. Further, because of their elasticity, the springs 19 and 20 afford elastic damping in addition to resistance to relative movement afforded by the viscous shear damping films between the inertia ring and the springs and between the springs and the housing. Any of numerous and varied combinations of viscous shear damping and elastic tuning response may be secured by suitable variations in the several parameters of relative mass, proportions and spring durometers in respect to the inertia mass, the elastic springs and the area ratios involved in the viscous shear film surface confrontations, to meet numerous and varied operating conditions. In the series combination relationship of the viscous shear film and the elastic springs, the total windup across the series elements is in inverse relation to the individual stiffnesses of the elements.

An elastomer should be chosen for the respective springs 19 and 20 which will suit the operational requirements, and in any event should be a suitable synthetic such as nitrile butadiene, ethylene-propylene, fluorosilicone or fluorocarbon rubber. By virtue of the hermetically sealed enclosure of the springs within the working chamber, full protection against deterioration due to oxidation and other chemical attack is afforded. The series combination of elasticity and damping reduces the working amplitudes across the elastomeric springs and the fluid film, promoting greater life in the elastomer and the damping fluid because any given relative motion is split up between the spring and the inertia mass so that both elements are subjected to smaller displacements than in a parallel damper relationship, such smaller displacements, added together, making up the given relative motion. In addition, the spring elements permit unimpaired functioning of the damper unit even where the casing of the housing may become dented during service or in handling, inasmuch as the elastomeric elements are sufficiently yieldable to avoid binding.

Another advantageous feature attained with the present damper is that of temperature compensation of damping coefficient. By properly selected thermal coefficient of expansion of the elastomeric springs relative to the housing and the inertia mass, the viscous shear film gaps enlarge at reduced temperatures due to relative elastomer shrinkage, while at higher temperatures the viscous shear film gaps become proportionately constructed due to relative elastomer expansion. By the proper relation of elastomeric spring coefficient of expansion to viscosity changes of the damping fluid, highly efficient, uniform damping results are attainable.

Another form of the series tuned viscous damper providing wide, flat working surface viscous shear damping film coupling is depicted in FIGURE 2 and in which the inertia mass provides the working chamber housing. To this end, an inertia ring assembly comprises a pair of suitably spaced apart inertia ring members 31 and 32 having their inner perimeters in coextensive axial alignment and with the outer perimeter of the member 31 extending sufficiently beyond the radially outer perimeter of the member 32 to receive the latter telescopically within an axially extending annular flange 33 which is permanently interlockingly engaged with the member 32 by means of an inturned distal marginal retaining terminal flange 34. Thereby the outer marginal portion of the member 32 is clamped against a spacer ring 35 and the joint is sealed by a compressed annular hermetic seal 37. A working chamber is provided by respective axially opening opposed complementary coextensive and coaxial recesses 38 and 39 in the inertia members 31 and 32.

For mounting the damper 30 on a structure subject to vibrations requiring damping, a mounting flange disk plate 40 is provided, which is of a diameter to extend concentrically in supporting relation into the working chamber. A flange portion of the plate 40 having bolt holes 41 extends radially inwardly from, and is exposed within the inner perimeter of the inertia ring assembly. On its outer perimeter, the mounting flange disk plate 40 provides a concentricity bearing for the inertia ring assembly, with the spacer ring 35 serving as a bearing for the inertia ring assembly and desirably being provided with an inner bearing facing 42 such as a bronze ring, where, for example, spacer ring 35 and the disk 40 are made from a ferrous material. Through this arrangement, the inertia ring 31, 32 is mounted on the disk plate 40 for substantially free relative rotation.

A damping coupling between the inertia ring 31, 32 and the supporting disk plate 40 is effected in series tuned viscous damping relationship by means of flat disk ring tuning springs 43 and 44 freely movable located within the working chamber recesses 38 and 39, respectively, and viscous damping fluid filled into the working chamber as through one or more filler holes 45 in the inertia ring member 31 and hermetically sealed closed as by welding. For maximum damping effect, the elastomeric spring ring disks 43 and 44 are substantially coextensive with and provide flat working faces confronting the flat axially inwardly facing working surfaces within the recesses 38 and 39 and with complementary confronting flat working surfaces 47 and 48 on the member 40 within the working chamber. The thicknesses of the tuning spring disks 43 and 44 are such that efficient viscous shear damping film gaps are afforded between the respective oppositely axially facing flat working surfaces of the spring disks and the confronting working surfaces of respectively the inertia disk members and the mounting member 40. A damping fluid thermal expansion reservoir is desirably provided along the inner perimeter of the working chamber as by means of respective grooves 49 and 50 in the inertia members 31 and 32 respectively. Equalizing flow of the viscous damping fluid between opposite sides of the mounting member 40 is provided for by one or more cross ports 51.

Dynamic sealing means in the joints between the inertia ring members 31 and 32 and the mounting member 40 are provided by means of wedge-shaped sealing rings 52 which are desirably of a substantially friction free material such as tetrafluoroethylene which may have fibre glass reinforcement. Sealing compression of the rings 52 into their joints under wear take-up pressure is effected by respective spring finger compression rings 53.

Operation of the damper 30 is substantially the same as described for the damper 5 of FIGURE 1. In order to accommodate conditions under which substantial heat may be generated in the damper in operation, cooling fins 54 may be provided on the respective outer faces of the inertia ring members 31 and 32.

A modified damper 55 is shown in FIGURE 3 which is in numerous respects similar to the damper 30 of FIGURE 2 but is of less massive construction. To this end, the damper 55 comprises complementary inertia ring members 57 and 58 in which the member 57 has a radially outer axially extending coupling flange 59 having a distal marginal terminal clamping flange 60 securing the engaged margin of the member 58 clampingly against a spacer ring 61 and compressing a static seal ring 62 to effect a hermetically sealed joint. Mounting of the inertia ring assembly 57, 58 is on a disk plate 63 which extends between the inertia ring members and provides a concentricity bearing for relative rotary movement of the inertia and mounting members, with a bronze bearing ring facing 64 between the spacer ring 61 serving as a bearing backing and the bearing edge of the member 63, if desirable.

For series tuned viscous damping coupling between the inertia ring assembly 57, 58 and the mounting member 63, working chamber space is provided within the inertia ring by an inner annular chamber recess 65 in the inertia ring member 57 and a corresponding inner annular chamber recess 67 in the inertia ring member 58. Within the chamber recesses 65 and 67 are respective elastomeric tuning spring ring disks 68 and 69 respectively having flat axially oppositely facing working surfaces confronting corresponding and opposed flat axially facing working surfaces on the inertia members 57 and 58 and the working member 63 and with the spaces between the confronting working surfaces in vicous shear damping film gap relationship.

Hydraulic damping fluid adapted to be filled into the working chamber of the damper 55 through one or more filler openings 70 hermetically sealed as by welding and equally distributive into both of the chamber recesses 65 and 67 by way of one or more distribution cross ports 71 in the member 63. Damping fluid thermal expansion reservoir space 72 is provided by a radially inward extension of the inertia member 57 and of the chamber recess 65 therein. Dynamic sealing of the joints between the inertia members 57, 58 and the mounting plate 63 is effected by means of respective anti-friction seal rings 73 mounted across the joints in confronting seal grooves and maintained under compression by a slightly sprung preloading of the inertia housing members 57 and 58.

In FIGURE 4 is disclosed a modified damper 75 on the order of the damper of FIGURE 1, but of less massive and lighter weight construction. For this purpose, the damper 75 comprises a housing structure having opposed complementary sheet metal stamping housing shell members 77 and 78 having respective radially outer axially oppositely extending annular flanges 79 and 80 with the joint therebetween thoroughly hermetically sealed by means of an epoxy seal 81. At their radially inner margins, the members 77 and 78 have respective parallel inset annular flanges 82 clampingly engaging therebetween an annular filler ring 83 to which they are secured as by means of rivets 84, with static hermetic sealing rings 85 in the joints. In the annular mounting flange thus provided, a suitable number of bolt holes 87 enable attachment of the damper housing fixedly to a structure such as a shaft subject to torsional vibrations requiring damping.

Between the housing members 77 and 78 is defined an annular working chamber 88 which is filled with a hydraulic damping fluid such as silicone through one or more filler openings 89 thereafter hermetically sealed as by welding. The damping fluid provides viscous shear damping couplings between an inertia ring member 90 of desirably rectangular cross section and mounted for free concentric relative rotary movements within the housing on means such as bearing rollers 91 which engage the inner perimeter of the inertia mass ring and ride in a track groove 92 defined between the proximal margins of the housing flanges 82 and the contiguous perimeter of the filler ring 83.

Axially oppositely facing flat working surfaces 93 of the inertia ring 90 are in viscous shear damping film coupling gap relation to the confronting working surfaces of coextensive, coaxial elastic, and preferably elastomeric spring ring disks 94 which have their axially outwardly facing flat working surfaces in viscous shear damping film gap relation to the inwardly facing flat axially facing working surfaces of the housing members 77 and 78, respectively. It will be appreciated that the inertia ring 90 and the tuning spring disks 94 function in series tuned viscous damping relation in the housing in the same manner and to the same effect as described in relation to the corresponding elements in the damper 5 of the FIGURE 1.

In addition, the damper 75 provides series tuned viscous damping between the outer perimeter of the inertia ring 90 and the housing and more particularly the flange 80 of the housing by a gap relationship accommodating therebetween a cylindrical elastic and more particularly elastomeric spring ring 95. A tuned viscous damping relationship is afforded between the spring ring 95 and the inertia ring and the housing by a viscous shear damping film gap relationship between both the inertia ring and the housing surface afforded by the flange 80.

By having the viscous damping shear coupling areas of the working surfaces of the spring ring disks 94 greater than the corresponding areas between the spring ring disks and the inertia ring 90, and alternatively or in addition thereto a similar relationship between the elastic spring ring 95 and the housing and the inertia ring, a desirable tuning modification is attained as compared with a substantially equal viscous shear damping coupling as in the dampers 30 and 55, or as compared with the damper 5 where there is a direct, untuned viscous shear damping film coupling between the inertia ring and the housing in addition to the damping coupling between the inertia ring and the tuning spring disks.

A further variety of modifications utilizing various of the features of the representative forms of the series tuned viscous dampers described may be attained by permutations and arrangements thereof, within the principles of the present invention, to meet numerous and varied operating conditions and requirements or design preferences.

It will be understood that variations and modifications may be effected without departing from the spirit and scope of the novel concepts of this invention.

I claim as my invention:

1. In a torsional vibration damper comprising a housing structure having opposed complementary annular sheet metal stamping housing shell members providing a working chamber having therein a ring-shaped inertia member free to move rotatably relative to the housing within the chamber:

said housing shell members having respective radially outer axially oppositely extending annular flanges overlapping and with a joint therebetween hermetically sealed;

said housing shell members having radially inner margins with respective parallel inset annular radially extending flanges clampingly engaging therebetween an annular filler ring;

means securing said inset flanges and filler ring fixedly together and thereby providing a composite annular mounting flange adapted to be fixed to a structure such as a shaft subject to torsional vibrations requiring damping;

means within said working chamber operative between said inertia member and the housing to resist relative rotation thereof with torsional vibration damping effect;

proximal margins of said inset flanges and the contiguous perimeter of said filler ring providing a track groove opening toward said inertia member;

and bearing rollers riding in said track groove and engaging the inner perimeter of said inertia member.

2. In a tuned vibration damper having means for attaching the same to a structure subject to vibrations to be damped:

relatively parallelly movable members one of which is an inertia mass and the other of which has said means for attaching to said structure, and which members have therebetween flat parallel working surfaces of substantial area and spaced substantially apart;

said other of said members providing an annular sealed working chamber;

said inertia mass member being of ring-shape and relatively rotatable, concentrically mounted in said chamber;

said working surfaces comprising annular axially facing areas of said members within said working chamber;

a flat elastomeric disk ring tuning spring between said working surfaces; and means coupling said spring ring and said members in series comprising at least one viscous damping film between said working surfaces and said spring ring.

3. A vibration damper according to claim 2, in which said spring ring is freely rotatable relative to both of said members and has complementary flat working surfaces opposing the working surfaces of said members in viscous shear damping film gap relationship.

4. In a tuned torsional vibration damper having means for attaching the same to a structure subject to vibrations to be damped:

relatively parallelly movable members one of which is an inertia mass;

one of said members defining a circular working chamber within which the other of said members is at least partially concentrically received and with confronting substantially spaced annular axially facing flat parallel working surfaces on the members within said chamber at each side of the member in the chamber and which surfaces are parallely movable in the movement of the members;

respective elastomeric spring ring disks between said working surfaces and having complementary flat annular working surfaces in viscous shear damping film relation to said working surfaces; and viscous damping fluid providing viscous shear damping films between said ring disk and member working surfaces.

5. A damper according to claim 4, in which the working chamber is provided by the inertia ring member, said member received within the chamber projecting radially inwardly from the chamber and from the radially inner perimeter of the inertia ring member and provides the means for attachment to a structure subject to vibrations to be damped, and means providing dynamic seals in joints between the members.

6. In a damper according to claim 5, in which the dynamic seals are wedge-shaped, and spring finger pressure rings thrusting said seals into the joints.

References Cited

UNITED STATES PATENTS

| | | | |
|---|---|---|---|
| 2,834,225 | 5/1958 | Carter et al. | 74—574 |
| 2,966,074 | 12/1960 | Rumsey | 74—574 |
| 3,049,941 | 8/1962 | Rumsey | 74—574 |
| 3,262,334 | 7/1966 | Edwards | 74—574 |
| 3,264,898 | 8/1966 | O'Connor | 74—574 |
| 3,285,097 | 11/1966 | O'Connor | 74—574 |
| 3,303,719 | 2/1967 | Beier | 74—574 |
| 3,373,633 | 3/1968 | Desmond et al. | 74—574 |

OTHER REFERENCES

Floyd, Don E., Polyamide Resins, 2d ed., N.Y.; Reinhold Publishing Corp., 1966, pp. 100–101.

FRED C. MATTERN, JR., Primary Examiner

F. D. SHOEMAKER, Assistant Examiner